Nov. 13, 1928.  W. L. ADAMS ET AL  1,691,622

FISHING REEL

Filed May 23, 1925

INVENTOR.
WALTER L. ADAMS
CHARLES T. PFLUEGER

ATTORNEY.

Patented Nov. 13, 1928.

1,691,622

UNITED STATES PATENT OFFICE.

WALTER L. ADAMS AND CHARLES T. PFLUEGER, OF AKRON, OHIO, ASSIGNORS TO THE ENTERPRISE MANUFACTURING COMPANY, OF AKRON, OHIO, A CORPORATION OF OHIO.

FISHING REEL.

Application filed May 23, 1925. Serial No. 32,437.

This invention relates to fishing reels and particularly to reels of the level winding type which are provided with mechanism driven in timed relation to the spool and which guides the line back and forth across the spool during the winding operation.

The objects of the invention are to provide a simple mechanism for this purpose and one in which the level wind mechanism is all carried in a self contained structure which may be removed from the reel as a body for cleaning, oiling or repairing. In reels of this type, the level wind mechanism requires considerable attention and by constructing it so that it may be removed as a unit, the reel is improved. It is also an object to construct the level wind mechanism so that it can be easily disassembled for cleaning, oiling or adjustment.

The level winding mechanism is also constructed so as to provide for full travel of the line laying carriage and to permit of efficient oiling. The reel is also compactly designed and is more economical of manufacture.

These and other objects will be readily apparent to those familiar with the art to which this invention pertains, and it will be understood that the invention is not necessarily limited to the exact form shown and described but may be modified within the scope of the claims appended hereto.

Figure 1:
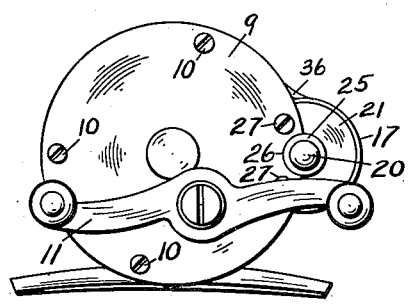
Figure 1 is an end view of the reel;
Figure 2:
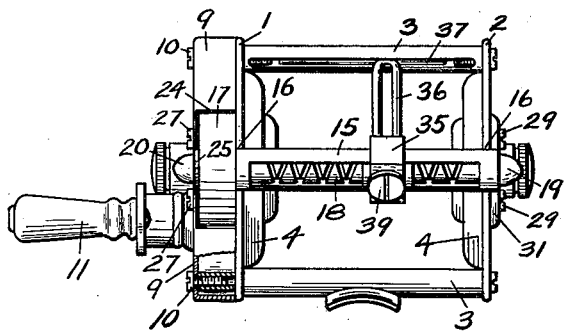
Figure 2 is a side view.
Figure 4:
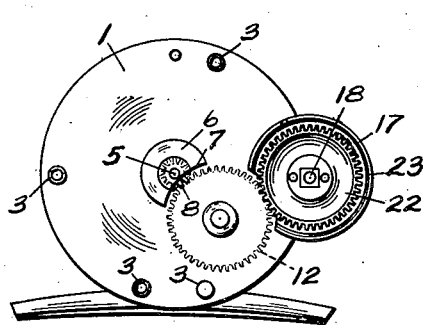
Figure 4 is an end view of the reel, certain parts having been removed to show the mechanism within the reel housing.
Figure 3:
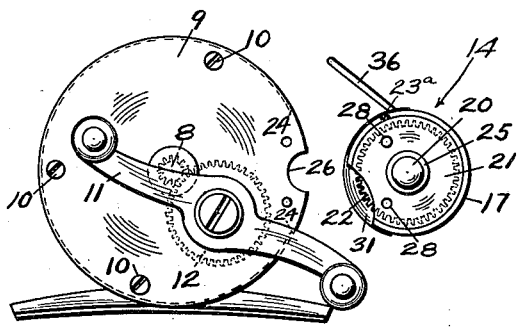
Figure 3 is an end view with the level wind mechanism removed from the balance of the reel.
Figure 5:
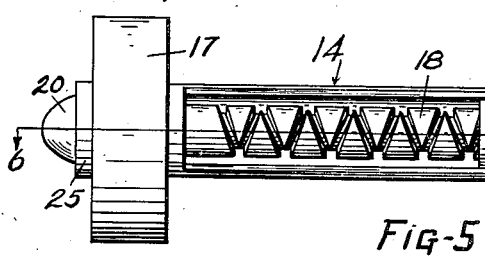
Figure 5 is an enlarged view of the level wind mechanism removed from the reel.
Figure 7:
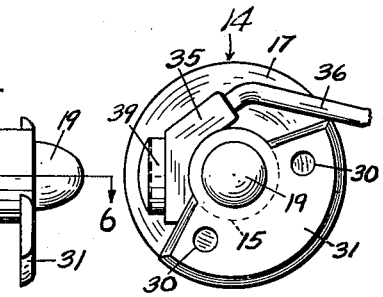
Figure 7 is an end view of Figure 5.
Figure 6:
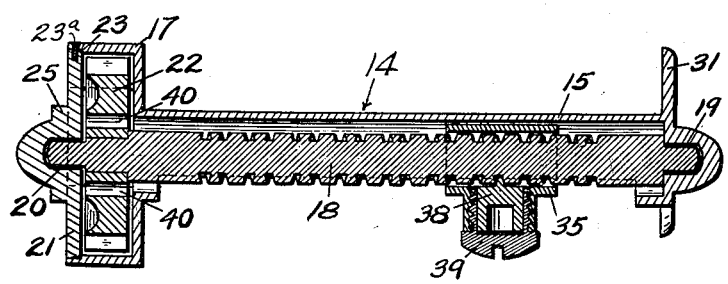
Figure 6 is a longitudinal section on the line 6—6 of Figure 5.

The reel comprises the usual front and back plates 1 and 2, respectively, which are secured to the pillars 3 to constitute the reel cage. The spool is indicated at 4 and is carried upon a shaft 5 supported at one end in the back plate 2 and at the other end in a bushing 6 carried upon the front plate 1, the bushing being cut away, as at 7, to expose the small pinion 8 by which the spool is driven.

The front plate 1 is covered by a flanged casing 9 which is held in position upon the projecting ends of the pillars 3 by screws 10. The cover plate or casing 9 has journalled thereon the crank 11 which is connected to the driving gear 12 carried upon the inner surface of the casing and removable therewith. The gear 12 meshes with the gear 8 and drives the spool shaft.

The mechanism which has been described constitutes a complete reel and is usable as such without the level wind mechanism. The level wind mechanism, which will now be described, constitutes no portion of the reel or framework, being a part which is separate and distinct from the balance of the reel and may be removed therefrom without in any way disturbing the remainder of the reel assembly. This is one of the advantageous features of the present construction and one which will appeal to the fisherman, as it permits him to attend to the level wind mechanism without tearing down the whole reel structure.

The level wind mechanism, which is indicated in general by the reference numeral 14, comprises an elongated tubular casing or housing 15 which is slotted at one side for a distance sufficient to permit the travel of the line guide carriage. The casing is adapted to seat in two semi-circular recesses 16 in the front and back plates, and is flanged and provided with an enlarged housing 17 which fits within an opening 24 formed in the flanged casing 9, the housing being cut away so as to clear the driving gear 12.

The double threaded traversing shaft 18 is mounted within the casing 15 having a bearing 19 at one end in the closed end of the casing and having a bearing 20 at its other end in a cap plate 21 which fits snugly upon a seat 23 within the housing 17 and is likewise cut away to clear the gear 12. A notch and pin 23ᵃ serve to position the cap plate relative to the housing. A gear 22 having a sliding, non-rotating fit upon the end of the traversing shaft is located within the casing and arranged to mesh with the driving gear when the level wind mechanism is assembled upon the reel. The plate 21 is formed with a boss 25 which seats within a recess 26 on the outer casing 9.

The level wind mechanism is secured in position by short screws 27 which pass through the casing 9 and enter openings 28 in the cap plate 21 and by means of screws 29 which pass through openings 30 in a flange 31 formed on the opposite end of the level wind casing 15. When it is desired to remove the level wind casing from the reel structure, the screws 27 and 29 are removed and the casing can be removed by grasping it by means of the bearings 19 and 20 and lifting it out of its seat. This operation is done without tearing down the reel structure and it will be observed that the level wind mechanism forms no parts of the framework of the reel, but is separate and distinct therefrom.

Within the casing 15 the traversing shaft 18 supports the sliding carriage 35 which projects through the slot and supports the looped line guide member 36 which rides at its upper end in a slot 37 formed on one of the pillars 3. The carriage is moved across the reel by a loose pawl or half nut 38 which is seated within a socketed cap screw 39 on the carriage.

It will be noted that the bearing sleeve which surrounds the traversing shaft is comparatively long so as to prevent any binding of the sleeve upon the shaft, and it will also be noted that the interior of the housing is unobstructed so that the sleeve has a full extent of travel beyond the front and back plates. This arrangement is an improvement over prior reel structures which, owing to the confined housing for the carriage, have necessitated the use of short bearing sleeves with their attendant disadvantages. Oil holes 40 are provided in the gear 22 to admit oil from the traversing shaft to the bearing. It will also be noted that after the level wind mechanism has been removed, it may be easily disassembled by removing the plate 21 and the gear 22 and lifting out the traversing shaft and line guide, or by removing the cap screw 39, whereby the traversing shaft may be removed endwise of the casing.

Changes and modification may be made in embodiments of the invention, it being understood that the claims are intended to cover such as come within the scope of the invention.

What is claimed is:

1. In a fishing reel, a reel structure including front and back plates, a spool and spool driving mechanism, a casing located at the side of the reel structure, said casing having flanges at the ends thereof adapted to fit against the front and back plates respectively, means to secure the flanges against said plates, and a level wind mechanism within the casing.

2. In a fishing reel, a reel structure including front and back plates, a spool and spool driving mechanism, a casing, a flange on one end of the casing adapted to fit against the back plate, an enlarged housing at the other end of the casing adapted to fit against the front plate, a reversely threaded shaft located within the casing, a line guide carriage upon the shaft, a gear upon the shaft located within the enlarged housing, and means to secure the casing in position at one side of the reel structure.

3. In a fishing reel, a reel structure including front and back plates, a spool and spool driving mechanism, a casing, a flange at one end of the casing adapted to fit against the back plate, an enlarged housing at the other end of the casing, a cover over the front plate, the housing being receivable between the cover and the front plate, a gear within the housing adapted to mesh with the spool driving mechanism, and level wind mechanism driven by the gear and located within the casing.

4. In a fishing reel, a reel structure including front and back plates, a spool and spool driving mechanism, a casing, a flange at one end of the casing adapted to fit against the back plate, an enlarged housing at the other end of the casing, a cover over the front plate, the housing being receivable between the cover and the front plate, a gear within the housing adapted to mesh with the the spool driving mechanism, and level wind mechanism driven by the gear and located within the casing, the casing together with the gear and level wind mechanism, being removable from the reel structure without disturbing the end plates.

5. A level wind mechanism adapted for attachment to a fishing reel which comprises front and back plates, a flanged cover upon the front plat, and a reel drive gear in the cover, said mechanism comprising a tubular housing, semi-circular seats in the edges of the front and back plates to receive the housing, a flanged gear housing upon the end of the tubular housing adapted to pass within the cover, a drive gear for the level wind mechanism within the gear housing and adapted to mesh with the reel drive gear, and means to secure the tubular housing upon the reel.

6. A complete, unitary level wind mechanism for attachment to fishing reels, comprising a tubular casing having a bearing in one end, a traversing shaft removable endwise of the casing and resting at one end in the bearing, a removable plate in the casing having a bearing for the other end of the shaft.

7. A complete, unitary level wind mechanism for attachment to fishing reels, comprising a tubular casing closed at one end and having a bearing in that end, a traversing shaft mounted in said bearing, the other end of the casing being open, and a plate fitted within the housing, said plate having a bearing for the other end of the traversing shaft.

8. A complete, unitary level wind mechanism for attachment to fishing reels, comprising a tubular casing closed at one end end having a bearing in that end, a traversing shaft mounted in said bearing, the other end of the casing being open, and a plate fitted within the housing, said plate having a bearing for the other end of the traversing shaft, the said shaft being removable endwise through the open end of the casing.

9. A complete, unitary level wind mechanism for attachment to fishing reels, comprising a tubular casing, a bearing at one end of the casing, a traversing shaft mounted at one end in the bearing, an enlarged housing at the other end of the casing, a plate fitted within the housing, said plate having a bearing for the other end of the traversing shaft and a gear for the traversing shaft located within the housing.

10. A complete, unitary level wind mechanism for attachment to fishing reels, comprising a tubular casing, a bearing at one end of the casing, a traversing shaft mounted at one end in the bearing, an enlarged housing at the other end of the casing, a plate fitted within the housing, said plate having a bearing for the other end of the traversing shaft and a gear for the traversing shaft located within the housing, said gear having oil holes transversely placed therein.

11. A fishing reel having front and back plates and level wind mechanism comprising a tubular housing extending the full length of the reel, a traversing shaft within the housing, and a carriage upon the shaft having an elongated bearing sleeve, the interior of the housing being unobstructed beyond the front and back plates.

12. A fishing reel comprising a housing, a traversing shaft within the housing, a bearing for one end of the shaft within the housing, a gear for driving the shaft located within the housing, and means for admitting oil from the region of the shaft through the gear to the bearing.

13. A fishing reel comprising a housing, a traversing shaft within the housing, a bearing for one end of the shaft within the housing, and a gear for driving the shaft located within the housing, the gear having a hole for permitting the passage of oil.

14. A complete unitary level wind mechanism for attachment to fishing reels, comprising a tubular casing, a bearing formed in one end of the casing, a removable plate at the other end of the casing having a bearing therein, a line guide shaft supported in said bearings, and means to determine the angular position of the plate in the end of the casing.

15. In a fishing reel, front and back plates, the edges of the plates being cut away to form notches, a casing seated in the notches and removably laterally of the reel, a reversely threaded shaft in the casing, a line guide carriage movable by the shaft, and gearing to drive the shaft.

16. In a fishing reel, front and back plates, the edges of the plates being provided with open arc-shaped notches, a tubular casing seated in the notches, the casing being provided with a slot the termini of which lie between the plates so as to leave the tube intact at the points where it rests in the notches, a threaded shaft located within the casing, and a guide carriage actuated by the shaft and extending through the slot.

17. In a fishing reel, front and back plates, the edges of the plates being provided with notches, a casing partially seated within said notches and having a slot therein, a threaded shaft within the casing, a line guide carriage actuated by the shaft and movable through the slot, means to retain the casing in position in the notches comprising a retaining member associated with the casing and resting against the outside of the back plate and screws passing through the retaining member and into the back plate, an enlarged housing associated with the casing and lying against the front plate, and a gear upon said shaft located within the housing.

18. A level wind mechanism for attachment to fishing reels, front and back plates, said mechanism comprising a tubular casing attached to the side of the reel and partially seated in the plates, a bearing at one end of the casing, a traversing shaft in the casing and seated in the bearing at one end, a line guide carriage on the shaft, means to attach the casing to the reel structure so that it may be removed with the shaft without disturbing the end plates, and the shaft being removable endwise of the casing after the latter has been removed from the reel.

19. A complete unitary level wind mechanism for attachment to fishing reels, comprising a tubular casing closed at one end and having a bearing in that end, a traversing shaft mounted in said bearing, an enlarged housing at the other end of said casing, the housing being separable, and a gear on the end of the shaft located within the housing, in combination with a reel structure comprising front and back plates and a cover over the front plate, the housing being receivable within the cover and a driving gear in the cover in mesh with the first named gear, the said mechanism being removably attached to the reel structure and the shaft being removable endwise from the casing after the latter has been removed from the reel structure.

WALTER L. ADAMS.
CHARLES T. PFLUEGER.